United States Patent [19]

Glavis et al.

[11] 4,248,797

[45] Feb. 3, 1981

[54] PREPARATION, POLYMERIZATION, AND USE OF NEW BIS-VINYLBENZYL NITROGENOUS MONOMERS

[75] Inventors: Frank J. Glavis, Rydal; David H. Clemens, Willow Grove, both of Pa.

[73] Assignee: Rohm and Haas Company, Philadelphia, Pa.

[21] Appl. No.: 943,502

[22] Filed: Sep. 18, 1978

Related U.S. Application Data

[62] Division of Ser. No. 779,426, Mar. 21, 1977, Pat. No. 4,137,264, which is a division of Ser. No. 593,906, Jul. 7, 1975.

[51] Int. Cl.$^3$ ............................................. C07C 85/04
[52] U.S. Cl. ..................................... 564/288; 564/384
[58] Field of Search ............... 260/567.6 M, 567.0 R, 260/570.9 R, 567.6 MR, 570.5 A

[56] References Cited

U.S. PATENT DOCUMENTS

| | | | |
|---|---|---|---|
| 2,676,987 | 4/1954 | Lewis et al. | 260/567.6 M |
| 2,772,310 | 11/1956 | Morris | 260/567.6 M |
| 2,780,604 | 2/1957 | Clarke et al. | 260/562.6 M |

OTHER PUBLICATIONS

Kunin et al., Ion Exchange Resins, pp. 38–49 (1952).
Hockenbottom, Reactions of Organic Compounds, pp. 444–445 (1957).

*Primary Examiner*—James H. Reamer

[57] ABSTRACT

This invention relates to vinylbenzyl and crosslinking bis-(vinylbenzyl) monomers for use in the preparation of polymers, especially ion exchange resins, and to methods for the preparation of the monomers and polymers. It is particularly concerned with the preparation, polymerization, and use of new nitrogenous monomers as crosslinking agents and/or function-introducing agents.

3 Claims, No Drawings

PREPARATION, POLYMERIZATION, AND USE OF NEW BIS-VINYLBENZYL NITROGENOUS MONOMERS

This is a division of application Ser. No. 779,426 filed Mar. 21, 1977, now U.S. Pat. No. 4,137,264, which in turn is a division of Ser. No. 593,906 filed July 7, 1975.

This invention concerns new nitrogenous, crosslinking monomers of the bis-(vinylbenzyl) type which comprise reaction products which are prepared from a mixture of vinylbenzyl chloride with an amine species, processes for synthesizing said monomers, and copolymerizing said crosslinking monomers with monovinylbenzyl monomers to obtain polymers which are useful, for example, as ion exchange resins, flocculants, thickeners, and the like.

Macroreticular and gel vinylbenzyl chloride polymers which possess a tertiary or a quaternary amine functionality have been prepared in the prior art by various methods as follows: (a) They may be made by first polymerizing or copolymerizing styrene and then chloromethylating the copolymer or the polymer and subsequently aminating the chloromethyl functionality. (b) A second way of making such polymers is to polymerize a vinylbenzyl chloride monomer and divinylbenzene crosslinking monomer mixture in a one step process. The resulting polymer is then aminated to provide a weakly, or strongly basic resin. For further details of a typical prior art process, see U.S. Pat. Nos. 3,637,535 and 3,843,566. The chloromethylation process, although widely used to provide polymers and ion exchange resins derived from such polymers, possesses inherent disadvantages. For example, the chloromethyl methyl ether (CME) which has been widely used as a chloromethylating agent to provide reactive chloro groups on the polymer is a substance of such great toxicity that its use is contraindicated. In addition, the multi-stage nature of the chloromethylation process of the prior art makes it inherently more expensive than the one-step process utilized to prepare the polymers of the present invention. A disadvantage of the one-step vinylbenzyl chloride (VEC) polymerization process of the prior art is that, in order to obtain weakly or strongly basic anion exchange resins, the vinylbenzyl chloride polymers must be aminated in an additional step to provide such anion exchange resins.

According to this invention, there are provided polymeric crosslinked poly(vinylbenzyl) macroreticular and gel resins which comprise (a) a copolymer of from 99.9% to 0.1% by weight of a vinylbenzyl amine monomer with from 0.1% to 99.9% by weight of total monomer mixture of a crosslinking unsubstituted or substituted bis-(vinylbenzyl) amine monomer or (b) a polymer of 100% of a crosslinking unsubstituted or substituted bis-(vinylbenzyl) amine monomer. Further, according to this invention, there are provided crosslinking and/or function-introducing monomers comprising the bis-(vinylbenzyl) amine moiety. Still further, according to this invention, there are provided processes for preparing said polymeric resins and said bis-(vinylbenzyl) monomers.

Generally preferred embodiments of this invention include copolymers comprising a crosslinked resin of (1) from 96% to 30% by weight of total monomer mixture of unsubstituted or substituted vinylbenzyl amine monomer and (2) from 4% to 70% by weight of total monomer mixture of unsubstituted or substituted bis-(vinylbenzyl) monomer. Most preferred embodiments of this invention include copolymers comprising a crosslinked resin of (1) from 96% to 85% by weight of total monomer mixture of unsubstituted or substituted vinylbenzyl amine monomer and (2) from 4% to 15% by weight of total monomer mixture of unsubstituted or substituted bis-(vinylbenzyl) amine monomer. Further, according to this invention, there is also provided a series of unsubstituted or substituted teritary and quaternary bis-(vinylbenzyl) amine monomers, a process for preparing said monomers, and a process for using said monomers as crosslinking agents and as function-introducing agents in the preparation of resins and polymers.

The bis-(vinylbenzyl) amine monomers of this invention may be unsubstituted or substituted on either the benzene nucleus of the vinylbenzyl group or the amine nitrogen atom of the monomer, or both. One, or both, of the vinylbenzyl moieties may contain up to 3 substituents selected from the group which consists of $C_{1-16}$ alkyl which may be linear or branched or saturated or unsaturated, halo, nitro, hydroxy, alkoxy, or amino. For example, the vinylbenzyl moiety may be substituted with alkyl such as methyl, ethyl, decyl, hexadecyl, isopropyl, isooctyl, allyl, hexenyl, and the like; halo such as chloro, bromo; alkoxy such as methoxy, ethoxy, benzyloxy; and amino such as primary amino monoalkylamino, such as monomethylamino, monoethylamino, dialkylamino, such as dimethylamino, diethylamino, pyrrolidino, cyclohexylamine and the like.

The nitrogen atom of the bis-(vinylbenzyl) amine monomer may be substituted to give a teritary or quaternary amine monomer with up to two substituents selected from the group which consists of $C_{1-16}$ alkyl as described hereinabove, aryl such as phenyl or naphthyl, or aralkyl such as benzyl and the like.

The invention provides a one-step polymerization process which avoids the toxicity problems of the prior art and provides polymeric products which are weakly or strongly basic anion exchange resins which possess highly favorable physical stability, thermal stability, regeneration efficiency, and column capacity. Not only does the process of the invention eliminate the chloromethylation step which employs the toxic chloromethyl methyl ether reagent, it affords products which are anion exchange resins in a simplified one-step method which is also inherently more economical.

The method of preparation of the teritary amine monomers and monomer precursors of this invention involves agitating mixtures of the appropriate aqueous amine, sufficient sodium hydroxide to maintain the product as the free base, and vinylbenzyl chloride over a period of several hours initially at reduced temperature (10°–20° C.) and then overnight at ambient temperature.

The method of preparation of the quaternary amine monomers and monomer precursors of this invention involves agitating either aqueous or organic solvent (for example, acetone:diethyl ketone, 1:1 vol.) mixtures of the appropriate amine and vinylbenzyl chloride at ambient temperature or at temperatures elevated sufficiently (usually between 30°–40° C.) to achieve reactivity. At the end of the period of agitation, phase separation is effected and the respective monomer products are isolated and characterized according to customary analytical methods known to those of ordinary skill in the art.

In making the gel polymers, the preferred polymerization technique is "suspension polymerization"

wherein the comonomer mixture is dispersed by means of a dispersant additive and agitated in a buffered aqueous phase in the presence of a cta catalyst and then heated sufficiently to effect reactivity. At the end of the reaction period, the batch is cooled to ambient temperature, the resulting solid product is collected and washed in a column with water until the effluent is clear.

As is known in the art, macroreticular polymers are prepared by a process which involves the presence of from 10 to 70% of a phase extender (or precipitant) which is a liquid which (a) acts as a solvent for the monomer mixture and is chemically inert under the polymerization conditions and (b) is present in such amounts and exerts so little solvating action on the crosslinked copolymer that phase separation of the product takes place. The general theory is that, when suspension polymerization is used, the precipitant must either be immiscible or only partially miscible with the suspending medium. Alkanols with a carbon content of from 4 to 10 will suffice as precipitants when used in the range of from 10 to 80% of total polymer mixture. A preferred precipitant is methyl isobutyl carbinol (MIBC) used preferably in the range of from 30 to 50%.

Catalysts which generate free radicals which, in turn, function as reaction ititiators include the widely known compounds of the peroxide and azo classes. Preferred catalysts which are employed in the processes of this invention include, for example, t-butyl peroctoate and t-butyl hydroperoxide in the range of from 0.01% to 3% by weight of the monomer mixture.

Additives which will effect dispersion of the monomer mix in an aqueous system as taught by this invention include the ammonium salt of a styrene maleic anhydride copolymer, carboxymethyl cellulose, bentonite, polyvinylimidazole, or poly(diallyldimethylammonium chloride). Preferred dispersants used in this invention include poly(diallyldimethylammonium chloride) and ammonium sulfate.

The following examples are illustrative of the present invention but are not to be construed as limiting in scope. All parts and percentages throughout the specification and claims are by weight unless otherwise indicated.

EXAMPLE I

Preparation of Vinylbenzyl Dimethylamine 676 grams (6.0 moles) of 40% aqueous dimethylamine, 150 grams of distilled water, and 144 grams (3.54 moles) of 98.2% sodium hydroxide pellets are mixed and cooled to 15° C. At this temperature, 486 grams (3.0 moles) of 98% vinylbenzyl chloride is added at a uniform rate over a period of five hours with agitation. The batch is then allowed to warm to ambient temperature (26° C.) and agitated at ambient temperature overnight. On stopping agitation, phase separation is obtained. The lower aqueous layer of 990 grams is withdrawn and discarded. A middle layer of 80 grams, which contains a mixture of starting materials and a quaternary amine product, bis-vinylbenzyl dimethylammonium chloride or hydroxide, is obtained. The top product layer is treated with activated charcoal and calcium chloride and then filtered to provide 365 grams of product, whose structure is confirmed by NMR and IR analyses and by the failure to form any complex with methyl orange. Other analyses yield the following data which further supports the given assignment of structure:

| me per gram | 6.10 (theory 6.21) |
|---|---|
| Nitrogen | 9.20% (theory 8.8%) |
| Chlorine | 0.59% (theory 0%; probably occluded) |
| Water | 0.2% |

EXAMPLE II

Preparation of Bis-(vinylbenzyl) Monomethylamine 20 grams (0.5 mole) of 98.2% sodium hydroxide pellets are dissolved, with stirring and cooling to a temperature maintained at 10° C., in a saturated solution of monomethylamine (large excess greater than one mole), which is prepared by bubbling gaseous monomethylamine into 200 ml. of distilled water at 10° C. until saturated. Then, 77.8 grams (0.5 mole) of 98% vinylbenzyl chloride are added at a uniform rate over a period of 30 minutes while maintaining the batch temperature below 20° C. Upon removing external cooling, the batch temperature rises to 32° C. in one hour as a result of an exotherm. The batch is then agitated at ambient temperature (26° C.) overnight. On stopping agitation, the phases cleanly separate within a period of one hour. The lower aqueous layer of 250 grams is withdrawn and discarded. The upper product layer of 50 grams is washed with three successive 100 ml. portions of water adjusted to a pH of 8.9, followed by one 100 ml. portion of distilled water (neutral pH). (Without the pH adjustment of the initial three wash portions, some foaming and emulsification occurs.) The washed product layer is then dried over calcium chloride and anhydrous sodium sulfate. Upon removing the drying agent, 38 grams of product is obtained. Analyses showed this material to have the following properties:

| Water | 0.24% |
|---|---|
| Nitrogen | 5.9% (theory 5.3%) |
| Chlorine | 0.80% |

EXAMPLE III

Preparation of Vinylbenzyltrimethylammonium Chloride (a) Aqueous Method 169 grams (1.11 mole) of 98% vinylbenzyl chloride is mixed with 326 grams (1.38 mole) of 25% aqueous trimethylamine at 30°-32° C. over a period of four hours. (Lower temperatures fail to achieve reactivity, probably because of the immiscibility of the reagent in the solvent). Then, the excess trimethylamine is removed by distillation at a batch temperature of 40° C. Cooling of the resulting batch mixture to 20° C. and discontinuing stirring effect separation of phases in about one hour. (Higher temperatures disallow phase separation.) The lower aqueous layer of 28 grams is withdrawn and discarded, leaving an upper product layer of 455 grams. Analyses show this product to contain 57.3% of water and to have an ionizable chlorine content of 6.98%. Calculation of product concentration from these two results gives 42.7% and 41.7% for vinylbenzyltrimethylammonium chloride by the water and ionizable chlorine analyses, respectively. This corresponds to circa 80% product yield.

(b) Solvent Method 477 grams (3.05 mole) of 98% vinylbenzyl chloride is dissolved in 2070 ml. of acetone:diethylketone (1:1 vol). While maintaining a batch temperature of 19°–24° C., 200 grams of trimethylamine is added to this solution over a period of six hours by bubbling the gaseous amine into the stirred, cooled solution. After stirring the resulting batch at ambient temperature (26° C.) for one hour, 1300 ml. of solvent is removed under vacuum. (This solvent mixture is saved and reused in subsequent preparations.) The resulting hydroscopic solid is dried in the reaction flask at reduced pressure and ambient temperature. 634 grams (90% yield) of resulting solid product is then carefully transferred to a tightly sealed bottle for storage to prevent water pickup.

EXAMPLE IV

Preparation of Bis-(vinylbenzyl)dimethylammonium Chloride (a) Aqueous Method 33.4 grams (0.214 mole) of 98% vinylbenzyl chloride is mixed with 125 grams of distilled water. While maintaining the batch temperature below ambient temperature by means of external cooling, 34.4 grams (0.214 mole) of vinylbenzyldimethylamine is added at a uniform rate over a period of 10 minutes. The reaction mixture is then slowly warmed to 35°–40° C. and then maintained at that temperature for 1.5 hours, whereupon the heterogeneous mixture becomes completely miscible and clear. On cooling to 25° C. and discontinuing stirring, the mixture separates into two phases. The lower product layer of 85 grams is withdrawn. Analyses show the product to contain 38.7% water and to have an ionizable chlorine content of 6.6%. The results correspond to a product assay of 61.3% and 60% by the water and ionizable chlorine analyses, respectively. Further analyses of the product shows 3.36% of nitrogen and no titratable base. The resulting 52.1 grams of product corresponds to circa 80% yield. The 107 grams of upper layer, whose analysis shows 92.9% water, 0.83% nitrogen, and 2.14% chlorine, is discarded.

(b) Solvent Method 50 ml. of methanol, 16.7 grams (0.107 mole) of 98% vinylbenzyl chloride, and 17.2 grams (0.107 mole) of vinylbenzyldimethylamine are mixed at 34° C. This batch mixture is stirred for 15 minutes at 34° C. and then warmed to 40° C. and stirred at that temperature for an additional 15 minutes. The cooled product was found to be 46.3% in methanol. NMR analysis confirms the assigned structure of the product.

EXAMPLE V

Preparation of Vinylbenzyltrimethylammonium Hydroxide 1000 ml. of IRA-400 beads (chloride form), (0.035 cubic feet, 1.40 equivalents) are placed in a 2-inch id column. 4000 ml. of 10% sulfuric acid is passed through the column to convert the resin to the sulfate-bisulfate form. 4000 ml. of water is then passed through the column to remove excess acid, and the column is left with one bed volume (180 ml.) of water. Then, 396 grams of 50% vinylbenzyltrimethylammonium chloride solution is passed through the column, followed by 700 ml. of chaser water. The first 300 ml. of eluate is discarded as containing no product. The following twelve cuts of effluent are combined to give 684 ml. of product, whose benzenoid structure is detected by UV analysis. The final 200 ml. of eluate is discarded. This 684 ml. of product solution is then treated with 210 grams of lime (CaO) in two portions, allowing each mixture to stir for one hour, whereupon the lime is removed by filtration. 90 grams of sodium hydroxide pellets are then added to the filtrate with stirring while maintaining the batch temperature at 35° C. The upper layer of 280 grams is separated and treated with 200 grams of 15% sodium hydroxide solution. The product layer of 241 grams is then separated. Analysis of the product gives the following results:

| Water | 27.9% |
|---|---|
| Sulfur | 0.26% |
| Chlorine | nil |
| Neutral equivalent | 193, corresponding to 66% vinylbenzyltrimethylammonium hydroxide in product layer (72.1% based on water content) |

This is a yield of 162 grams, or 90% of theory. Another preparation according to the same procedure gives the following analytical results:

| Water | 10.0% |
|---|---|
| Sulfur | 0.0% |
| Chlorine | 0.23% |
| Neutral equivalent | 275, or 95% content of vinylbenzyltrimethylammonium hydroxide |

EXAMPLE VI

Copolymerization of Vinylbenzyloimethylamine and Bis-(vinylbenzyl)monomethylamine (Gel Type)

An aqueous phase is prepared by adding the following ingredients sequentially and stirring the resulting mixture under a positive pressure of nitrogen:

| Tap Water | 150 ml. |
|---|---|
| Boric Acid | 3.3 grams |
| NaOH/50.9% in water | 1.0 ml. (This adjusts the pH to 10) |
| Poly(diallyldimethylammonium chloride solution/ 16% assay | 7.8 ml. (8.0 grams) |
| Gelatin | 0.88 grams |

To the aqueous phase, in the absence of stirring and under positive pressure of nitrogen, is added a monomer mixture of 7.5 grams of bis-(vinylbenzyl)monomethylamine, 67.5 grams of anhydrous vinylbenzyldimethylamine, and 0.75 grams of t-butyl peroctoate. The resulting mixture is then agitated at 222 rpm, and the batch is heated to 80° C. and maintained at this temperature for ten hours. After this time, the batch is cooled. The resulting beads are then separated, placed in a column, and backwashed until the effluent water is clear. These beads are then analyzed to give the following data:

| Total Solids | 52.6% |
|---|---|
| Anion Exchange Capacity | 5.80 me/gram |
| Strong Base Capacity | 0.06 me/gram |
| Swelling, Acid-Base Cycling | 270% |

EXAMPLE VII

Comparative Copolymerization of Vinylbenzyldimethylamine and Divinylbenzene (Gel Type)

A copolymer prepared in the manner identical to Example VI except from a monomer mix of 92:8 vinylbenzyldimethylamine and divinylbenzene gives the following analytical results:

| Total Solids | 55.8% |
|---|---|
| Anion Exchange Capacity | 4.68 me/gram |
| Strong Base Capacity | 2.00 me/gram |
| Swelling, Acid-Base Cycling | 250% |

Note well the nominal strong base capacity of the weak base resin of this example as compared with the absence of such strong base capacity in the resin of Example VI.

EXAMPLE VIII

Comparative Polymerization of Bis-(vinylbenzyl)monomethylamine (Gel Type)

The effectiveness of the novel crosslinking agent is demonstrated by the following analytical results from a polymer prepared as in Example VI except from a monomer mix consisting solely of the monomer, bis-(vinylbenzyl)monomethylamine, in the presence of 1.0% of t-butyl peroctoate:

| Total Solids | 77.5% |
|---|---|
| Anion Exchange Capacity | 2.70 me/gram |
| Strong Base Capacity | 0.25 me/gram |
| Swelling, Acid-Base Cycling | 8.0% |

EXAMPLE IX

Copolymerization of Vinylbenzyltrimethylammonium Methylsulfate and Bis-(vinylbenzyl)dimethylammonium Chloride (Gel Type)

An aqueous phase is prepared by dissolving 258.6 grams of ammonium sulfate (domestic grade) in 300 grams of tap water with stirring. The reaction flask and stirred contents are then sparged with nitrogen for 15 minutes, and then the reaction flask is swept with a sufficient amount of nitrogen for the remainder of the reaction so as to maintain a positive pressure.

To the aqueous phase at 23° C., in the absence of agitation, is added a monomer phase of 70 grams of water, 35 grams of bis-(vinylbenzyl)dimethylammonium chloride, and 15 grams of vinylbenzyltrimethylammonium methylsulfate. The resulting mixture is then agitated at 180 rpm and is warmed to 32° C.

To this mixture is added an initiator phase of 2.0 ml. of 70% t-butyl hydroperoxide. The resulting stirred batch is heated at a temperature of 30° C. for 16 hours. The batch temperature is then raised to 40° C. and maintained for 40 minutes, and finally raised to 95° C. over a period of 75 minutes while adding 125.5 grams of ammonium sulfate to maintain a saturated solution for the continuous phase. After heating and stirring for four hours at 95° C., the batch is cooled to ambient temperature, stirring is discontinued, and the batch is filtered to remove the resulting beads. The beads are then washed twice with 1-liter portions of water at 50° C. The beads are then placed in a column and backwashed with water until the effluent is clear. Upon air-drying overnight, these beads are analyzed to give the following results:

| Total Solids | 40.7% |
|---|---|
| Anion Exchange Capacity | 4.07 me/gram |
| Strong Base Capacity | 3.81 me/gram (This is determined by removing the chloride from the resin by treating with caustic, followed by NaCl in 0.01 N sodium hydroxide.) |

EXAMPLE X

Copolymerization of Vinylbenzyltrimethylammonium Hydroxide and Bis-(vinylbenzyl)dimethylammonium Chloride (Gel Type)

(a) Preparation of Bead Form

To an aqueous phase of 350 ml. of 50.9% sodium hydroxide is added at ambient temperature a monomer phase of 50 grams of 65.8% aqueous vinylbenzyltrimethylammonium hydroxide (32.9 grams of 100% monomer) and 15 grams of bis-(vinylbenzyl)dimethylammonium chloride. Then, agitation is started at 400 rpm, and a resulting exotherm raised the batch temperature to 37° C. After 12 minutes, 0.5 ml. of 70% t-butyl hydroperoxide is added. After 6 minutes, a nitrogen sparge is started and, after another 5 minutes the batch is warmed to maintain the temperature at 35° C. Then, 0.03 grams of isoascorbic acid is added and the batch heated to 40° C. After 15 minutes, an additional 0.5 ml. of 70% t-butyl hydroperoxide is added, and the reaction mixture is stirred and heated at 40° C. overnight. Then the batch is heated to 95° C. for two hours. The aqueous phase is then siphoned-off, and the beads are washed with three 500 ml. portions of water. The swollen beads are then downwashed in a column with 5% sodium hydroxide solution and then air-dried. Analysis of the beads gives the following results:

| Chloride | 5.4% |
|---|---|
| Hydroxide form | 47.3% |
| Carbonate form | 47.3% |
| Anion Exchange Capacity | 1.46 |

(b) Preparation of Particulate Polymer

The polymerization system as in "a" above is repeated with the following monomer phase: 14.0 grams of anhydrous bis-(vinylbenzyl)dimethylammonium chloride, 36.0 grams of anhydrous vinylbenzyltrimethylammonium chloride, and 50 grams of distilled water.

After mixing the aqueous and monomer phases, the batch is stirred at 289 rpm and 1.50 ml. of 70% t-butyl hydroperoxide is added. Upon maintaining a temperature of 35° C. overnight, a particulate polymer is formed.

EXAMPLE XI

Copolymerization of Vinylbenzyldimethylamine and Bis-(vinylbenzyl)monomethylamine (Macroreticular)

An aqueous phase is prepared by adding the following ingredients sequentially and stirring the resulting mixture under a positive pressure of nitrogen:

| | |
|---|---|
| Tap Water | 225 ml. |
| Boric acid | 4.9 grams |
| NaOH/50.9% in water | 1.5 ml. |
| Poly(diallyl dimethyl-ammonium chloride) solution/16% assay | 7.8 ml. (8.0 grams) |
| Gelatin | 1.32 grams |

To the aqueous phase, in the absence of stirring and under positive pressure of nitrogen, is added a monomer mixture of 7.5 grams of bis-(vinylbenzyl)monomethylamine, 67.5 grams of anhydrous vinylbenzyldimethylamine, 0.75 grams of t-butylperoctoate, and 37.5 grams of methyl isobutylcarbinol (MIBC) phase extender. The resulting mixture is agitated at 215 rpm, and the batch is heated to 80° C. and maintained at this temperature for 16 hours. The batch is then cooled and the resulting beads separated, placed in a column and backwashed until the effluent is clear. The opaque beads give the following analytical data:

| | |
|---|---|
| Total Solids | 33.8% |
| Anion Exchange Capacity | 5.75 me/gram |
| Strong Base Capacity | 0.04 me/gram |

We claim:

1. A process for the preparation of the crosslinking monomer, bis-(vinylbenzyl)monomethylamine, which comprises reacting vinylbenzyl chloride with monomethylamine with cooling to reduce the reaction temperature below about ambient temperature during at least the initial portion of the reaction time, in a solution containing sufficient alkali metal hydroxide to maintain the amine as the free base.

2. A process for the preparation of the crosslinking quaternary ammonium monomer, bis-(vinylbenzyl)-dimethylammonium salt, which comprises reacting vinylbenzyl chloride with vinylbenzyldimethylamine in solution at a temperature not greater than about 40° C., and converting the resulting quaternary ammonium chloride product to the appropriate salt form by passage of the chloride form over the desired salt form of an anion exchange resin.

3. A process for the preparation of the crosslinking monomer, bis-(vinylbenzyl)dimethylammonium chloride, which comprises reacting vinylbenzyl chloride with vinylbenzyldimethylamine in solution at a temperature from about ambient temperature to about 40° C.

* * * * *